United States Patent [19]

Kollross

[11] Patent Number: 4,649,601
[45] Date of Patent: Mar. 17, 1987

[54] METHOD AND AN APPARATUS FOR CYCLICALLY CHARGING THE FILLING TUBE OF A SAUSAGE STUFFING AND CLOSING MACHINE WITH READY-FOR-STUFFING TUBULAR CASING LENGTHS

[75] Inventor: Günter Kollross, Wallerstädter, Fed. Rep. of Germany

[73] Assignee: Teepak Produktie N.V., Lommel, Belgium

[21] Appl. No.: 792,162

[22] Filed: Oct. 24, 1985

Related U.S. Application Data

[63] Continuation of Ser. No. 554,241, Nov. 22, 1983, abandoned.

[30] Foreign Application Priority Data

Nov. 27, 1982 [DE] Fed. Rep. of Germany ....... 3244064

[51] Int. Cl.⁴ .............................................. A22C 11/02
[52] U.S. Cl. ............................................. 17/49; 17/33; 53/122; 53/576
[58] Field of Search ................... 17/41, 42, 33, 35, 49; 53/138 R, 138 A, 122, 576

[56] References Cited

U.S. PATENT DOCUMENTS

| | | | |
|---|---|---|---|
| 3,112,516 | 12/1963 | Bonnee | 17/42 |
| 3,964,236 | 6/1976 | Smith | 53/122 |
| 4,306,334 | 12/1981 | Niedecker | 17/42 |
| 4,358,873 | 11/1982 | Kollross | 17/41 X |
| 4,495,751 | 1/1985 | Galbiati | 53/576 |

Primary Examiner—Willie G. Abercrombie
Attorney, Agent, or Firm—Howard M. Ellis; Michael L. Dunn

[57] ABSTRACT

For cyclically charging the filling tube of a sausage stuffing and closing machine with ready-for-stuffing tubular casing lengths, a tubular casing material flatly wound upon a supply roll is first withdrawn, opened and, in respectively one section length, drawn upon a support. Thereupon the drawn-on casing section is divided off the material cord and, along with the support, is placed ahead of the charging tube for conveyance thereto while at the same time, a new casing section is drawn onto another support to repeat these working steps in permanent alternation of the two supports. The invention resides in that each support after being placed ahead of the charging tube along with the casing section drawn thereonto is pushed in the same direction in which the drawing onto the support was performed beforehand, onto the charging tube up to the stopping means, whereupon the support is advanced in the same direction, pulled out of the retained casing section and, finally, removed laterally. This will save precious time until a new charging operation starts and enhance the degree of efficiency. A corresponding apparatus for implementing the method is equally suggested.

13 Claims, 6 Drawing Figures

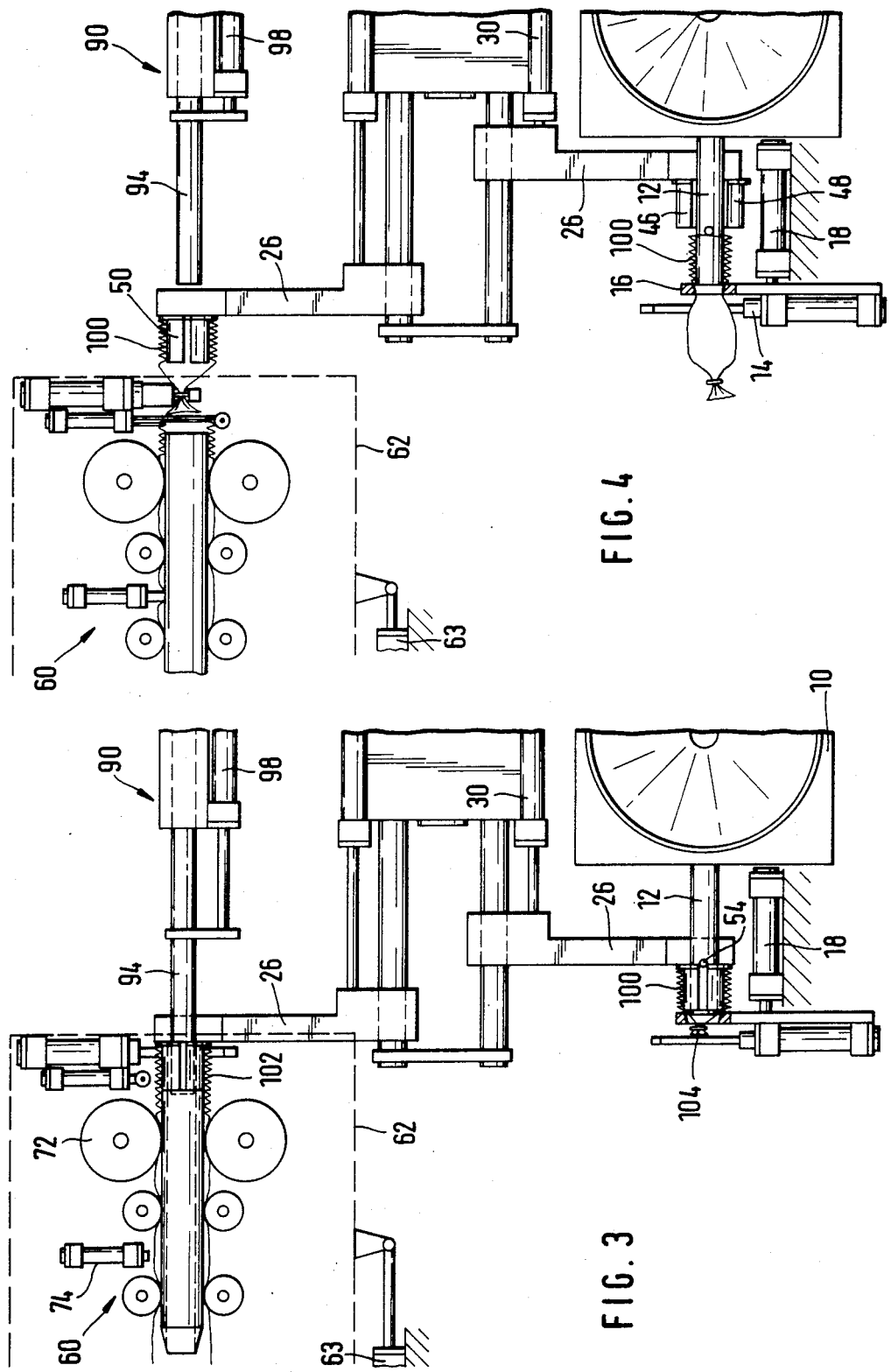

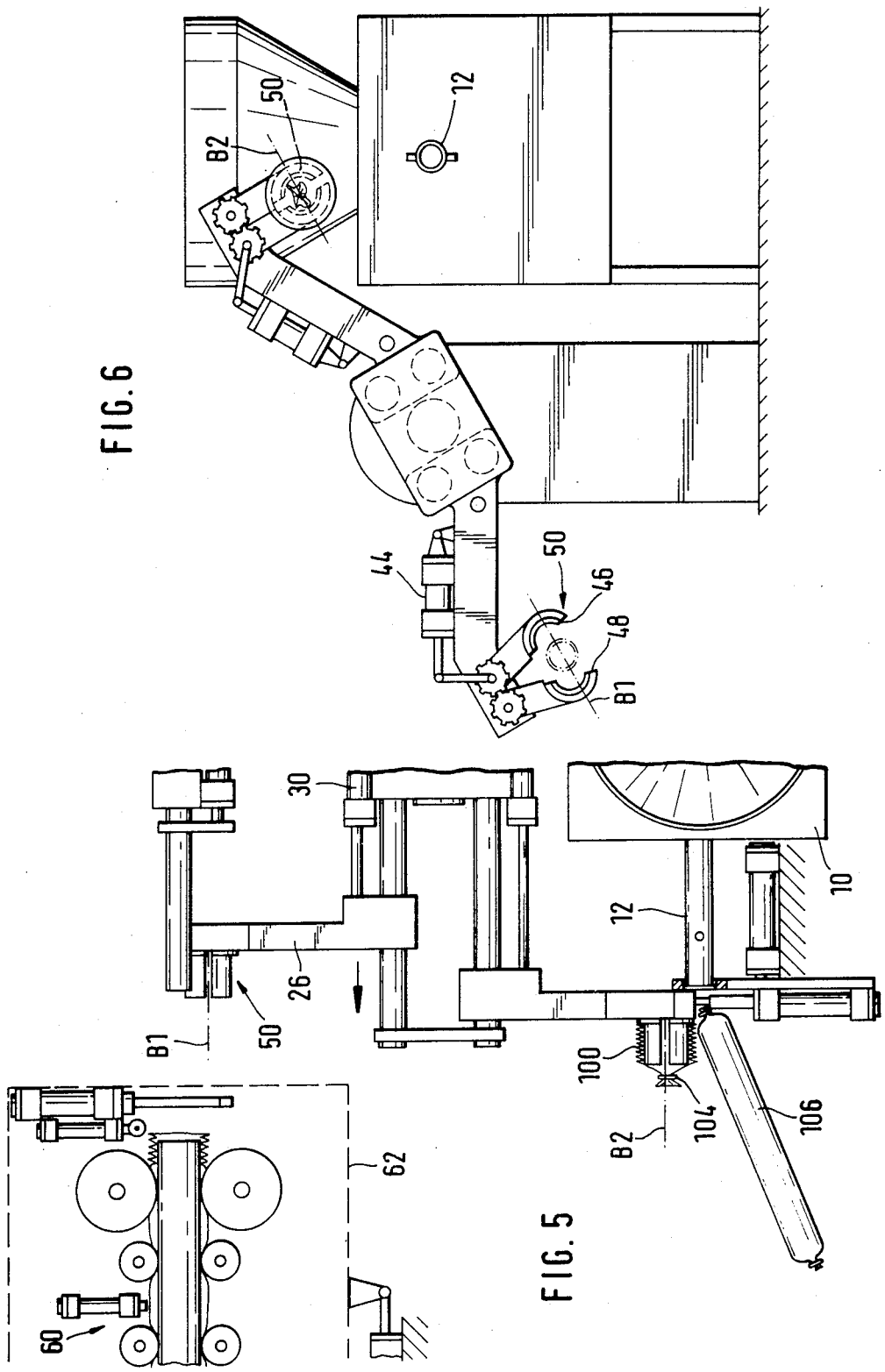

METHOD AND AN APPARATUS FOR CYCLICALLY CHARGING THE FILLING TUBE OF A SAUSAGE STUFFING AND CLOSING MACHINE WITH READY-FOR-STUFFING TUBULAR CASING LENGTHS

This is a continuation of application Ser. No. 554,241, filed Nov. 22, 1983, now abandoned.

DESCRIPTION

The present invention is concerned with a method of cyclically charging the filling tube of a sausage stuffing and closing machine with ready-for-stuffing tubular casing lengths, with a tubular casing material flatly wound on a supply reel being first withdrawn, opened and drawn by respectively one section length onto a support; thereupon the drawn-on casing length is divided off and along with the support is placed ahead of the filling tube for being conveyed thereto while, at the same time, a new casing length is drawn onto another support to repeat the afore-described working steps in constant alternation of the two supports.

Such a process is implemented by the apparatus as shown in FIG. 3 of DE-OS No. 29 41 872, in which a revolver means provided with two diametrically staggered, parallel support tubes in each switching position, with respectively one tube, is arranged opposite the opening and drawing mechanism and, with the other tube, is arranged opposite the filling tube of the sausage stuffing and closing machine. In that apparatus, relatively extended tubular casing sections are alternately drawn onto the support tubes and are shirred to form tubular corrugations while at the same time, the inflatory air required for shirring through the support tube, is introduced into the tubular interior. After the tubular corrugation having been divided off, the revolver mechanism will switch the support tube charged therewith to a point ahead of the filling tube placing the same into abutment therewith, whereupon the tubular corrugation by way of a mechanical sweeper is pushed onto the support tube. As this pushing step is performed in opposition to the drawing and shirring steps, with the corrugation end divided off in the lead, it will not be possible for the end of the casing material advancing during stuffing, to be closed already in the shirring position. After the same having been pushed onto the charging tube, special manipulations will, therefore, be required in order to pass the open tubular casing end through the casing brake of the stuffing machine to place the same into the working area of the closing mechanism concerned, where the latter will still have to close off the casing end before the stuffing operation can start. As the stuffing operation will anyway require substantially more time than the drawing and shirring of the casing material on the second support tube, this will, apparently, substantially impair the overall efficiency of the apparatus. As, moreover, the tubular corrugations after shirring will tend to burst open along the support tubes, a part of the casing material during indexing the revolver into the next position, is liable to be pushed forward beyond the end of the support tube and wedged between the support tube and the charging tube thereby preventing the corrugation from being properly pushed onto the charging tube.

Also, it has been repeatedly suggested to use a charging tube revolver in which the tubular casing lengths are directly drawn onto one of at least two charging tubes provided on the revolver while forcemeat is stuffed through the other tube into the casing material unrolling therefrom. In such charging tube revolvers, the afore-mentioned wedging problem does not occur per se. However, owing to the required means for controlling the forcemeat flow respectively only through the tube occupying the working position, they are costly to produce and time-consuming for their daily cleaning requirements.

Moreover, a special problem envolved with such charging tube revolvers resides in the supply of the inflatory air in respect of which the charging tubes contaminated with forcemeat cannot be used. In the example of embodiment according to FIGS. 1 and 2 of DE-OS No. 29 41 872 operating with such a charging tube revolver, a cannula separated from the charging tube revolver is, therefore, provided for the supply of inflatory air, which cannula after indexing the revolver into the next position, at the outer side of the charging tube arrived at the shirring position, is placed into an axial position and after shirring is again drawn out of the tubular corrugation.

In another prior art apparatus comprising a charging tube revolver (DE-OS No. 27 21 392) opening and drawing of the tubular casing material is performed in vacuum by reciprocating suction tools engaging the casing at the outer side thereof. This will not permit an axial shirring of the tubular material, and the link casings for respectively only one sausage that are due for being processed will nevertheless require large-dimensioned charging tubes with the result of an excessive mass of the revolver envolving correspondingly extended dead times during indexing to the next position.

In another state-of-the-art apparatus comprising a charging tube revolver (DE-OS No. 31 08 074) the opened tubular end is first drawn onto a support sleeve to push the same along with the drawn-upon tubular casing section onto the charging tube, with the tubular end being held there in position and the support sleeve withdrawn to permit closing and dividing off the end of the drawn-upon tubular casing section disposed ahead of the charging tube. As the support sleeve, hence, will permanently remain within the tubular material cord, the supply of inflatory air during drawing can be foregone. However, an axial shirring of the tubular material in this case will not be possible either so that the apparatus is suitable only for the processing of individual casings nevertheless requiring large-dimensioned charging tubes, and a support sleeve of a correspondingly extended length and displaceable along the full length thereof resulting in excessive dimensions, mass movements and dead times.

Basic to the invention is the problem of providing a method for cyclically charging the filling tube of a sausage stuffing and closing machine with ready-for-stuffing tubular casing sections supplied from a supply roll which, with a lowest possible time requirement for the provision of the new tubular casings on the filling tube, can do without a charging tube revolver, permitting a safe and smooth conveyance of the casing sections previously drawn at a different point onto a support and prior to dividing off already closed at one end, onto the stationary single charging tube.

Starting from the prior art method of the afore-mentioned type that problem, in accordance with the invention, is solved in that each support after placement thereof ahead of the charging tube along with the casing section drawn thereupon, in the same direction in which it has been drawn beforehand onto the support, is pushed onto the charging tube up to the stop means for the tubular casing section, whereafter the support is advanced in the same direction, pulled out of the fixedly held casing section and, virtually, is removed laterally.

As in the method according to the invention the drawing of the casing material onto the support, the pushing of the support onto the charging tube and, virtually, the pulling of the support out of the tubular casing held on the charging tube with the aid of the stop means are performed in one and the same direction, it will be possible even without using a charging tube revolver, for the tubular casing sections to be already closed during dividing off. Moreover, immediately after pushing on the support along with the tubular casing, the closing means of the charging machine with the casing brake attached thereto can be brought into position on the projecting charging tube end with no need to await removal of the support from the charging tube. This will save precious time until a new charging operation is started, thereby increasing the efficiency of the apparatus.

Since—as already set forth—drawing on and dividing off the tubular casing sections from the casing material will take place far more raidly than the stuffing of the tubular casing sections placed upon the charging tube with forcemeat, it will be possible immediately upon drawing each of the casing sections on the charging tube, for the next section to be drawn upon the other support, closed off and divided off while the charging operation is still in process. This will permit in an advantageous embodiment of the invention that while the stuffing is still in process, the other support with the casing section drawn thereon in the vicinity of the charging tube is made ready for final placement ahead of the charging tube whereas the first support will first remain on the charging tube in the position as pulled out of the tubular casing section and only upon making available the second support in the vicinity of the charging tube will, in turn, laterally be removed therefrom. This will substantially reduce the distance to be covered by the support charged with the new tubular casing after termination of the stuffing operation and removal of the closing means and the casing brake from the charging tube in order to be placed ahead of the charging tube, which will further decrease the dead times between the stuffing operations.

Moreover, in a further advantageous embodiment of the method according to the invention, it is permitted, owing to the fact that the direction of drawing onto the support and the direction of pushing the support and the casing section onto the charging tube are identical, that inflatory and and/or liquid for internal wetting is supplied in known per se manner to the tubular material during drawing on through the support.

The method of the invention permits both charging the filling tube with tubular sections of extended length and shirred to form corrugations, and with individual casings, with the latter, feasibly, being equally shirred axially on the support to form transverse folds. This will allow to keep the supports extremely short and to keep the support mass small to safeguard a rapid placement thereof ahead of the charging tube.

However, in both cases it will be of advantage to secure the shirred casing sections against axially bursting open after shirring which according to another feature of an advantageous embodiment of the method of the invention, feasibly, is achieved in that the casing sections after having been drawn upon will be clamped from the inside onto the support, which clamping will be released only during pushing onto the charging tube.

An apparatus specifically suitable for implementing the method of the invention is based on the prior art construction having two support tubes movable by means of an indexable revolver alternately ahead of a casing opening and drawing mechanism, and ahead of the charging tube of the sausage stuffing and closing machine, respectively, with the casing opening and drawing mechanism being provided with a cutting tool for dividing the drawn-upon casing sections off the material cord, and a closing mechanism including a casing brake overlapping the stuffing tube during stuffing being provided ahead of the charging tube, that during indexing the revolver means into the next position are movable out of the swing range of the support tubes, which apparatus according to the invention, is further characterized in that the casing opening and drawing mechanism—viewed in the axial direction of the support tubes—is disposed opposite the charging tube, that the support tubes with the ends thereof facing the charging tube are provided on the revolver means and by separate drives are mounted thereon in an axially reciprocable manner, and that the support tubes in a plane extending throught the axis of the revolver means are divided into two tubular segments which in controlled manner can be spread apart into a spacing position permitting their being laterally moved away from the charging tube.

A preferred example of embodiment of an apparatus for implementing the method of the invention will now be described in closer detail with reference to the drawing, with the method itself being equally explained in closer detail. In the drawings, FIG. 1 schematically shows a plan view of the apparatus in the position immediately upon completion of indexing the revolver means into a new working position;

FIGS. 3 to 5 show sectors of the plan view according to FIG. 1 in other positions during a working cycle, and FIG. 6 is a front view of the revolver means similar to the one as shown in FIG. 2 in the position according to FIG. 5.

Figure 1:
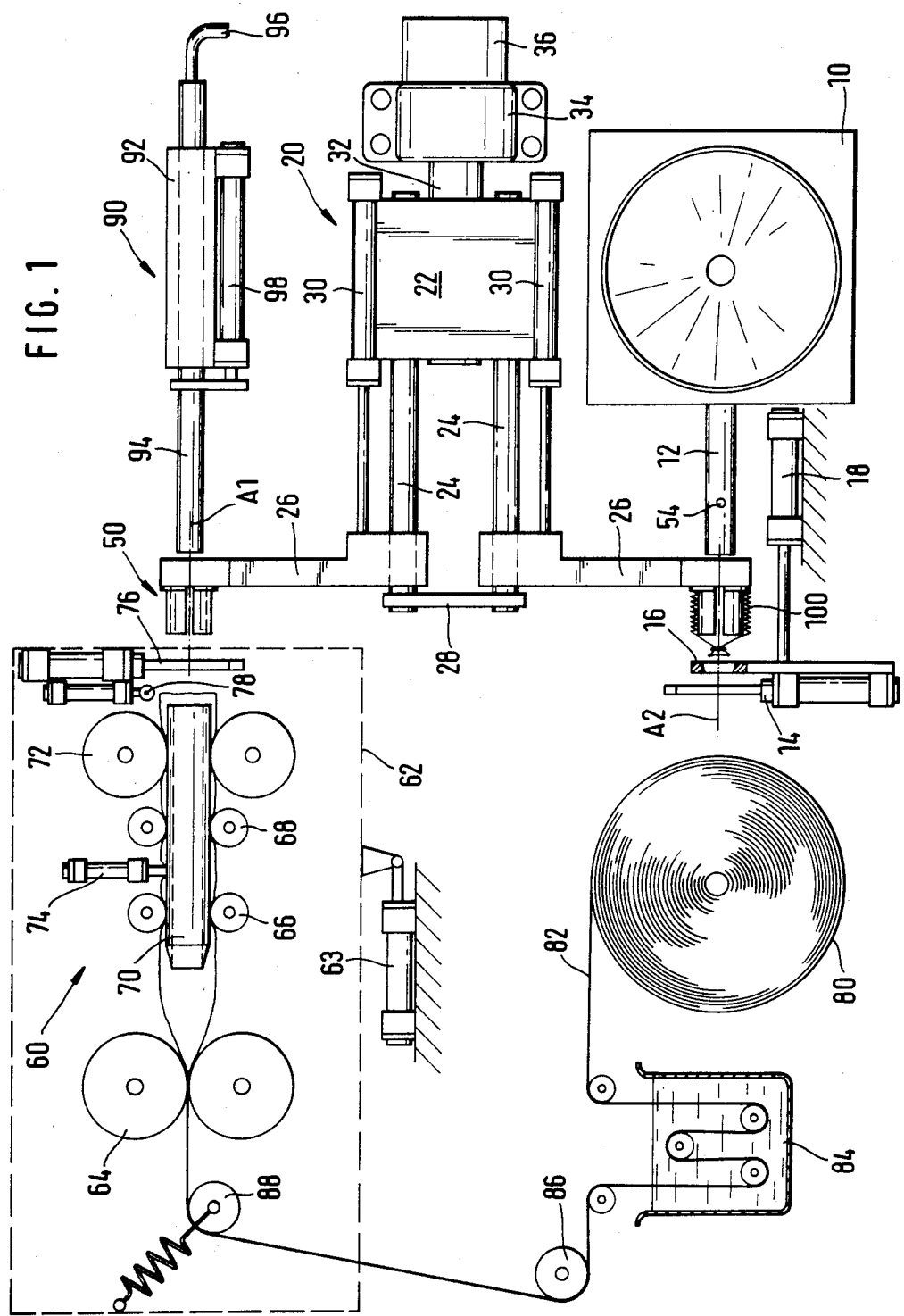

Referring to the drawing, a sausage stuffing machine is designated by reference numeral 10, the charging tube 12 of which is to be charged with tubular casing sections for filling forcemeat thereinto and for subsequently closing off the same to form link sausages.

Disposed ahead of the charging tube 12, in known per se manner, are a closing mechanism 14 for the setting of clamps, and a casing brake 16. Casing brake 16 is integrally formed with the closing mechanism 14 and can be displaced by a power cylinder 18 between the releasing position as shown in FIG. 1 for charging the filling tube with a new casing section, and the working position as shown in FIG. 3 in which the casing brake 16 overlaps the filling tube end in known manner for braking the casing material during the stuffing operation.

Arranged next to stuffing machine 10 is a revolver means generally designated by reference numeral 20. Revolver means 20 includes a revolver head 22 having two pairs of guide rods 24 disposed opposite one another in axially parallel relationship, on which is displaceably guided respectively one support arm 26. The free ends of guides rods 24 are interconnected by a plate member 28. With the aid of respectively one power cylinder 30, support arms 26, separately, can be displaced between the pushed-forward position as shown in FIG. 1 and a retracted position as occupied by the support arm disposed ahead of the stuffing machine 10 as shown in FIG. 4.

Figure 2:
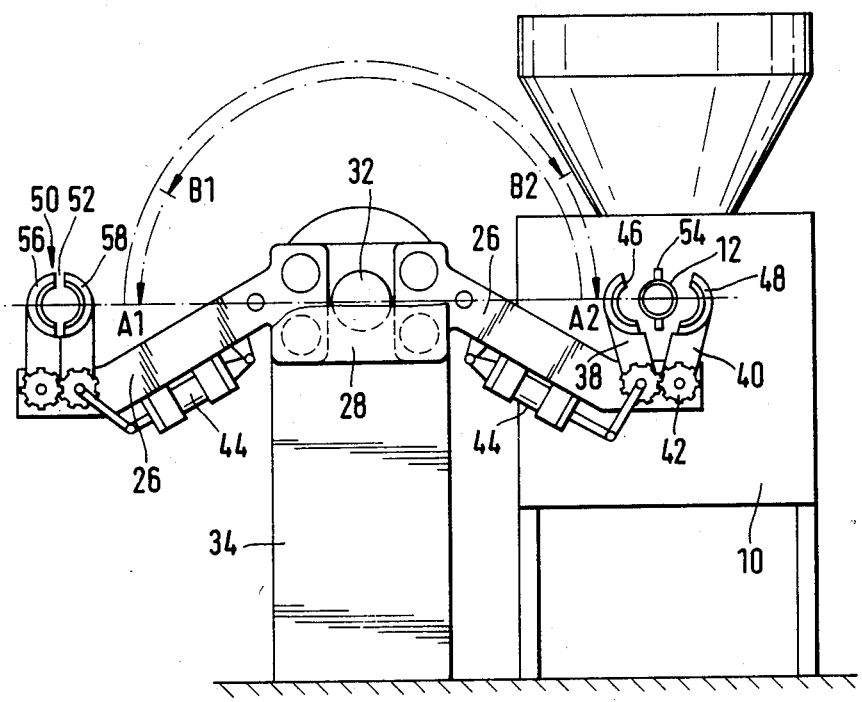
FIG. 2 is a front view of the revolver means according to FIG. 1.

Revolver head 22 is carried by a shaft 32 that is rotatably disposed in a bearing block 34 mounted on the floor next to stuffing machine 10 and by means of a swivel drive schematically indicated at 36 is switched between two working positions A1 and A2 staggered with respect to one another at 180° via respectively an intermediate or stand-by position B2 and B1, respectively as shown in FIG. 2 by rotation indicating arrows.

As is, furthermore, revealed by FIG. 2, respectively two arms 38, 40 are disposed on the ends of the support arms 26 in swingable manner about parallel axes and by means of a power cylinder 44 are coupled to one another through a pair of gears 42 for swinging in counterclockwise direction. Arms 38,40 carry tubular segments 46,48 which, with arms 38,40 in abutment swung one against the other, complement to form pairs of support tubes 50. The pairs of levers 38,40 of the two support arms 26 point to opposite circumferential directions, and support arms 26 themselves over revolver head 22 are so oppositely bent in the circumferential direction that support tubes 50 relative to the axis of the revolver means 20 are disposed diametrically opposite one another thereby exchanging their positions whenever they change over from one working position into the other, with the support tubes 50 in the one working position designated in FIG. 2 by A2, being in coaxial alignment with the charging tube 12.

Tubular segments 46,48 have a circumferential extension of respectively less than 180° thus leaving in the aforementioned abutting position of levers 38,40 axially continuous gaps 52 between the longitudinal edges of the tubular segments, through which can pass two retaining pins 54 diametrically mounted on the charging tube 12 at a space from the tube opening, as soon as the support tube 50 after reaching the working position A2 is pushed over the charging tube 12 by retracting the power cylinder 30.

By actuating power cylinder 44, levers 38,40 and tubular segments, 46,48 carried thereby, from the closing position as shown to the left in FIG. 2 can be spread apart into an opening position shown therein in which the opened support tube 50 upon actuation of the revolver means 20 after the support tube having been pushed onto the charging tube can in unimpeded manner be laterally swung, i.e. to the top and to the bottom, respectively.

Tubular segments 46,48 at the secured ends thereof are provided with circular flanges 56,58 which, with the support tube 50 being closed, form an abutment for the tubular casings to be drawn upon.

Drawing the casing tubes onto the support tubes 50 is performed by a casing opening and drawing mechanism which is generally designated by reference numeral 60. The casing opening and drawing mechanism is mounted on a carriage 62 only schematically illustrated in broken lines, which carriage by means of a power cylinder 63 is displaceable between a pushed-back position as shown in FIGS. 1,4 and 5 and a working position as shown in FIG. 3.

Mounted on carriage 62 are a pair of pressure rollers 64, two pairs of guide rods 66,68 along with a shirring tube 70 held floatingly therebetween, and a shirring tool indicated by two shirring wheels 72. Moreover, carriage 62 carries a pneumatically or electromagnetically operable clamping means 74 for clamping shirring tube 70 to the tubular casing material extending thereabove, and at the front end facing the revolver means 20 carries a closing tool 76 for setting individual closing clamps, and a separating means 78 directly therebehind which, in the example, is formed by a filament movable transversely through the casing material.

The opening and drawing means 60 is supplied from a supply roll 80 with tubular casing material 82 flatly wound thereon in a continuous length. The tubular casing material 82 first passes a watering means 84 in which it is brought up to its ready-for-stuffing moisture content; it is then passed via a stationary pulley 86 and a clamping roll 88 resiliently mounted on carriage 62 between the pressure rollers 64 to reach the shirring wheels 72 where it is opened and while passing between the guide rolls 66,68 is finally presented to the shirring tube 72.

Disposed opposite the opening and drawing mechanism 60 is a stationary air supply means 90 including a supply tube 94 displaceable in a holder 92 into which tube 94 air under a slight excessive pressure can be supplied via a flexible hose 96 from a compressed air source (not shown). Supply tube 94 is in coaxial alignment with shirring wheels 70 and support tube 50 disposed in position A1 and, by means of a power cylinder 98, can be pushed forward from a retracted position as shown in FIGS. 1,4 and 5 in which the air supply, feasibly, is discontinued, and a working position as shown in FIG. 3 in which it protrudes into support tube 50, blowing air through shirring tube 70 into the opened tubular casing material which can thereby be inflated throughout the opening area.

Instead of or simultaneously with the inflatory air, fluid, preferably oil, can be passed through the supply tube 94 in order to thereby wet the inside of the tubular material.

The apparatus as described serves for making available shirred tubular casing sections 100 on respectively one support tube 50 with the aid of the casing opening and drawing mechanism 60, and for conveying respectively one such tubular casing length 102 to the charging tube 12 after complete indexing of the revolver mechanism 20 into the next position.

For the following explanation of the way of operation of such a working cycle, it is assumed that the individual components of the apparatus occupy the position as shown in FIG. 1 immediately after indexing the revolver means 20 into a new working position, wherein tubular segments 46,48 disposed in switch position A1 are oppositely swung to an empty support tube, tubular segments 46,48 disposed in switch position A2 with a shirred tubular casing length 100 provided thereon by actuation of power cylinder 44 are so spread apart in the spreading direction that the tubular casing length is held by inside clamping thereby preventing an axial bursting open from occurring carriage 62 with the casing opening and drawing means 60 being inoperative and clamping means 74 operated, is in the retracted position, the air supply means 90 with the air supply discontinued, is in the retracted position, the closing mechanism 14 and the casing brake 16 are withdrawn from the charging tube 12, and sausage stuffing machine 10 is turned off.

Starting from that position, the working cycle is as follows:

Carriage 62 is advanced by power cylinder 63 anc clamping means 74 is released. At the same time, tube 94 of the air supply means 90, with the aid of power cylinder 98, is pushed forward into the working position and the power cylinder is turned on. The casing opening and drawing mechanism 60 is then switched on whereby tubular casing material 82 is continuously withdrawn from the supply roll 80 through the watering means 84, opened via the floating shirring tube 70 frontsidedly supported on the support tube 50, and, by forming transverse folds, is drawn upon the support tube 50 in the form of a corrugation 102 (FIG. 3, top).

Meanwhile, on the other support arm 26, tubular segments 46,48 are oppositely swung for removing the clamping of the tubular section length 100, and power cylinder 30 is operated in the direction of retraction with the result that the support tube 50 with the tubular casing length 100 closed off at the end thereof at 104, is pushed onto the charging tube 12 until the tubular casing length 100 is engaged by the retaining pins 54 and held back from continued movement with the support tube 50 (FIG. 3, botttom). With the support tube 50 being pushed toward the charging tube, the power cylinder 18 will, at the same time, extend to place the closing mechanism 14 ahead of the charging tube 12 where the casing brake 16 overlaps the charging tube end with the tubular casing material drawn thereupon. Stuffing machine 10 is then immediately switched on, starting to stuff the tubular casing length 100 pushed onto the charging tube, with forcemeat (FIG. 4, bottom).

After the casing opening and drawing mechanism has pushed a predetermined length of tubular casing material onto the respective support tube 50 it will be turned off, and the tubular segments 46,48 for clamping the shirred tubular casing material are spread apart. At the same time, the air supply to the air supply means 90 is discontinued and the air supply tube 94 is retracted with the aid of the power cylinder 98. The clamping means 74 will then clamp the shirring tube 70, and the power cylinder 63 will withdraw carriage 62 along with the casing opening and drawing mechanism 60 thereby providing between the clamped-in-place shirring tube 70 and support tube 50 a larger space for setting a closing clamp by the closing mechanism 76 and for cutting the so closed-off tubular casing length 100 from the tubular casing length 82 with the aid of a separating means 78 (FIG. 4, top).

Meanwhile, the other support tube 50 has been pushed further onto the charging tube 12 thereby having been pulled out of the retained tubular casing length 100, with power cylinder 44 having spread apart the two tubular segments 46,48 shown to the right in FIG. 2 (FIG. 4, bottom).

Hence, the revolver means 20, actually would be ready for indexing into a new working position and for placing the new tubular casing length 100 drawn in position A1 onto the respective support tube 50, into a position ahead of the charging tube 12. However, here, the stuffing operation has not yet been finished so that swinging of support tube 50 with the new tubular casing length 100 into working position A2 would be impeded by closing mechanism 14 and casing brake 16. However, the spreading apart of the tubular segments 46,48 of the other support tube on charging tube 12 will already permit a partial swinging of the revolver means 20 by about 160° (FIGS. 5 and 6) into an intermediate or stand-by position in which support tube 50 carrying the new tubular casing length 100 and clamping the same from the inside, will occupy position B2 while on the other support arm 26, the tubular segments 46,48 will reach position B1 next to the air supply means 90 in which they are oppositely swung and advanced again with the aid of power cylinder 30.

After completion of the stuffing operation on charging tube 12, closing mechanism 14 will close the rear end of the so formed sausage 106 and is retracted together with the casing brake 16 by the power cylinder 18 into the position releasing the charging tube, with sausage 106 dropping on a collecting surface (not shown) (FIG. 5, bottom).

Now revolver means 20 can again be operated, swinging the support tubes 50 into positions A2 and A1, respectively, thereby establishing the same state as at the beginning of the working cycle except for the exchanged support tubes so that a new working cycle can be initiated, it being understood that in the said second working cycle, the revolver means 20 will have to be swung in the opposite direction. This reciprocating swinging movement of the revolver means 20 caused by the arrangement of the levers 38,40 on the support arms 26, has the advantage that the supply of pressure medium to the power cylinders 28 and 44 may be performed via flexible hoses so that costly pressure medium supply arrangements tending to leakage, supplying rotating parts, can be eliminated. It will be apparent that the invention is not restricted to the afore-described example of a specific embodiment. In particular, it will be possible within the basic conception of the invention to replace support tubes 50 formed by the two tubular segments 46,48 by other elements such as, for example, a one-sidedly slitted support tube having a carriage width such that the charging tube can pass through the slit, or a plurality, e.g. four, of circumferentially distributed rods between which, equally, an adequate space is provided for allowing the charging tube to pass therethrough. In a construction of that type, power cylinders 44 can be allowed to be eliminated, provided that it will be acceptable for the tubular casing lengths not to be clamped on the supports.

What is claimed is:

1. A method for packaging food products in food casings, which comprises the steps of forming from a length of tubular film a first pleated strand at a draw-on casing station, positioning said first pleated strand on a first strand support, severing the first pleated strand on said first strand support from the remaining length of tubular film, and automatically transferring the first pleated strand from the first strand support to a charging tube at a filling station to form a stuffed food casing, said method including the step of closing off the trailing end of the severed pleated strand before filling.

2. The method of claim 1 including the step of forming a second pleated strand at the draw-on casing station for transfer to a second strand support which alternates with said first strand support in the receipt and transfer of pleated strands from the draw-on casing station to the charging tube.

3. The method of claim 2 including the step of positioning the second pleated strand in proximity to the filling station and forming a third pleated strand at the draw-on casing station while the first strand is being stuffed on the charging tube.

4. The method of claim 2 including the step of transferring a pleated strand from a strand support to a stationary charging tube at an adjacent filling station.

5. An apparatus for packaging food products, which comprises means for shirring a length of tubular film withdrawn from a supply source into a pleated strand, means for engaging the pleated strand formed by said shirring means, means severing the pleated strand from the supply source and means for closing off the trailing terminal end of the severed strand to form a read-for-stuffing length of tubular casing, said apparatus including means for stuffing the ready-for-stuffing casing with a food product, said stuffing means including a charging tube for engaging the ready-for-stuffing casing, means for transferring the ready-for-stuffing casing to the charging tube for stuffing, and means for closing off the stuffed casing to form a packaged food product.

6. The apparatus of claim 5 including means for conveying the strand engaging means from the shirring means to the regions of the charging tube.

7. The apparatus of claim 6 including drive means for reciprocal movement of the strand conveying and strand engaging means between the charging tube and the shirring means.

8. The apparatus of claim 5 wherein the charging tube is stationary.

9. The apparatus of claim 8 including a plurality of reciprocally driven strand conveying and strand engaging means for cyclically transferring the ready-for-stuffing casings from the shirring means to the charging tube for stuffing.

10. The apparatus of claim 5 wherein said stuffing means includes means for forming linked sausages.

11. The apparatus of claim 5 wherein the strand engaging means comprises elements which expand and contract for gripping the strand.

12. The method of claim 2 including the step of positioning the second pleated strand on the second strand support and moving said strand support to a stand-by position while the first pleated strand is being filled on the charging tube.

13. The method of claim 2 wherein the length of tubular film is ready-for-stuffing type.

* * * * *